Nov. 22, 1949 W. D. BOYNTON ET AL 2,488,578
INSULATION TESTING DEVICE
Filed March 18, 1944 2 Sheets-Sheet 1
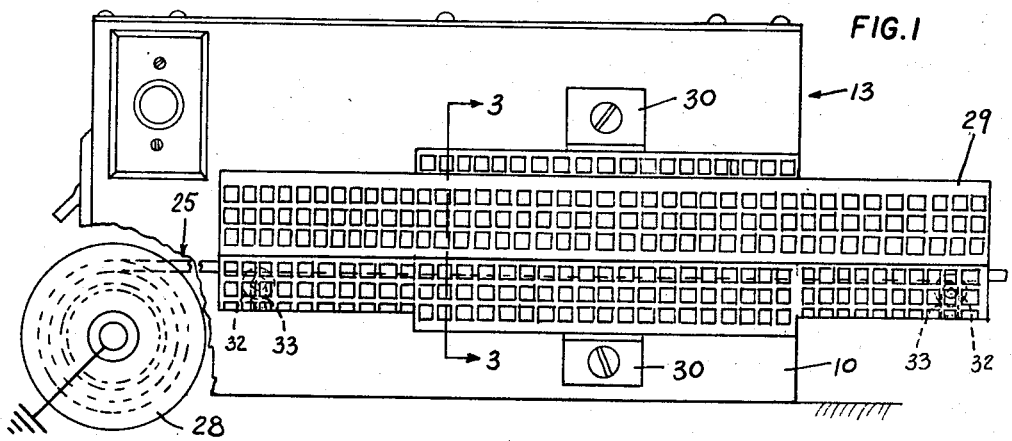
FIG.1
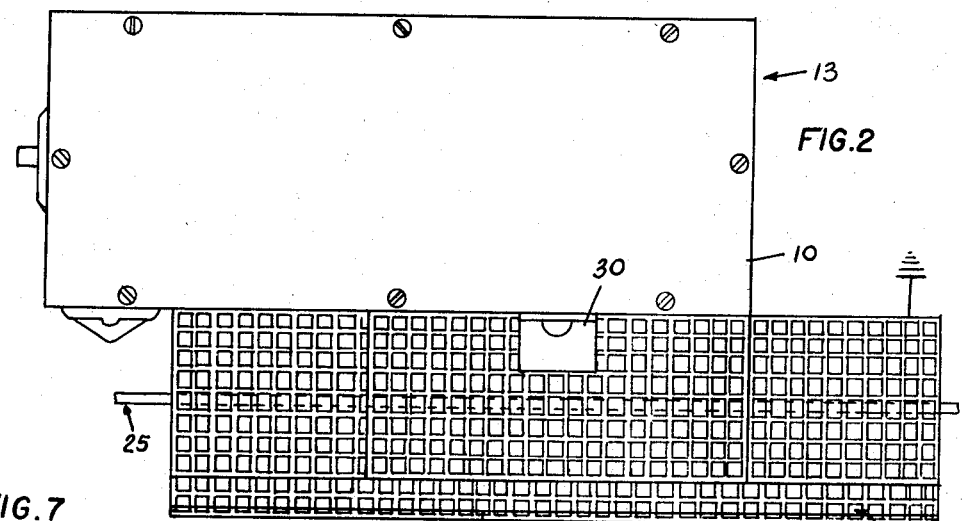
FIG.2
FIG.7
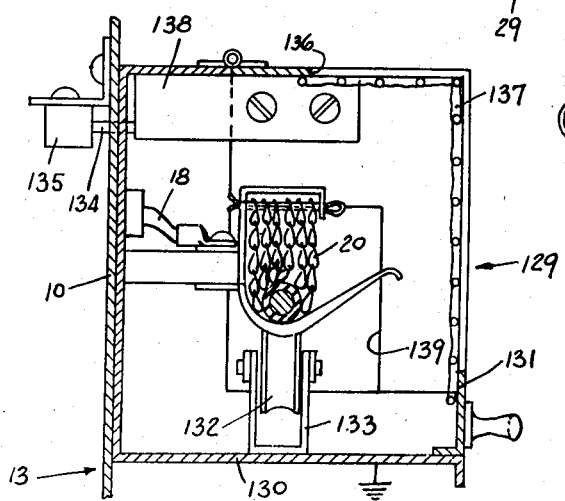
FIG.6
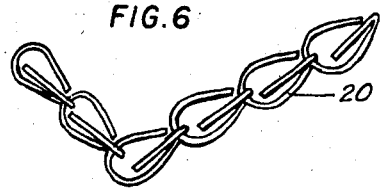
INVENTORS
W. D. BOYNTON
C. E. LEWIS
G. R. PAGE
BY
ATTORNEY

INVENTORS
W. D. BOYNTON
C. E. LEWIS
G. R. PAGE

ATTORNEY

Patented Nov. 22, 1949

2,488,578

UNITED STATES PATENT OFFICE 2,488,578

INSULATION TESTING DEVICE

Wentworth D. Boynton, Clay E. Lewis, and George R. Page, Baltimore, Md., assignors to Western Electric Company, Incorporated, New York, N. Y., a corporation of New York Application March 18, 1944, Serial No. 527,134

5 Claims. (Cl. 175—183)

This invention relates to insulation testing devices and more particularly to electrodes for continuously testing the insulation of moving insulated conductors.

In certain testing operations, an article being tested must be contacted at substantially every point around its periphery by an electrode forming part of the apparatus designed to perform the testing operation. This is especially true when testing insulating jackets made of rubber or rubber-like compositions, such as are employed in the manufacture of wires and cables.

An object of the invention is to provide new and improved insulation testing devices.

One insulation testing device embodying the invention comprises a composite electrode made up of a trough-shaped contactor over which an insulated wire is advanced and a plurality of very flexible chains of unequal length suspended from one of their ends so as to permit the lower ends of the chains to rest upon and around the insulated conductor. An elongated guard surrounds the composite electrode and is provided with a tortuous passage through which a wire may be threaded to place it into engagement with the electrode but which prevents contact of an operator's hand with the electrode.

A complete understanding of the invention may be obtained from the following detailed description of a specific embodiment thereof, when read in conjunction with the appended drawings, in which Fig. 1 is a front elevation of a device embodying the invention;

Fig. 2 is a plan view of the device;

Fig. 6 is an enlarged view of a fragment of a contacting element forming a part of the device, and Fig. 7 is a vertical section of an alternative form of the device.

Figure 4:
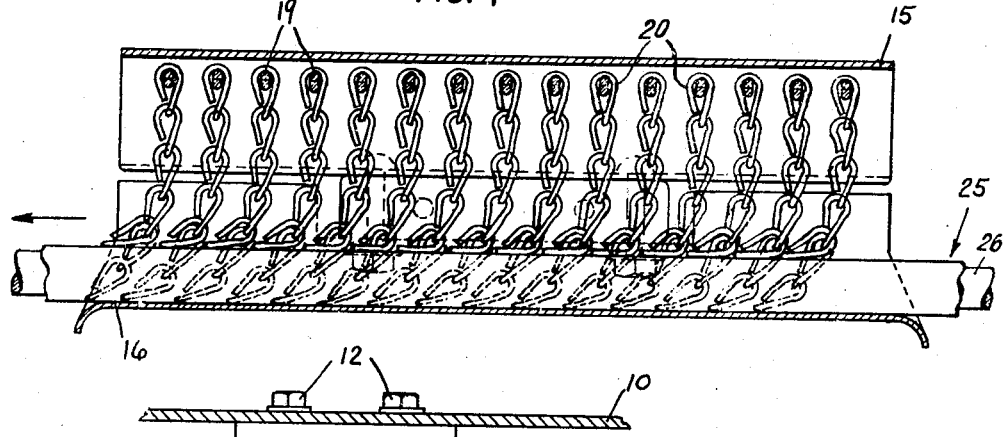
Fig. 4 is a section taken along line 4—4 of Fig. 3.
Figure 5:
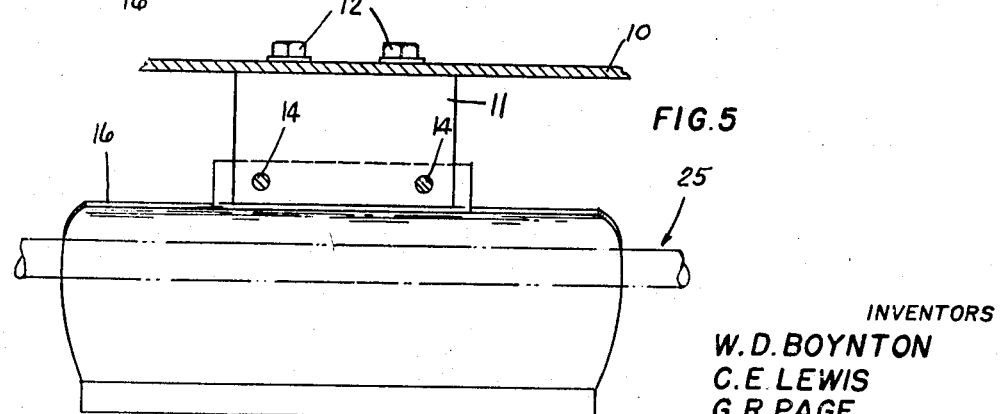
Fig. 5 is a section taken along line 5—5 of Fig. 3.

Referring more specifically to the drawings, a housing 10 (Fig. 3) forming a part of a test set 13 of a conventional type, serves to support an arm 11 of suitable electrical insulating material, which is secured thereto by bolts 12—12 (Fig. 5). A horizontal bracket 15 and a horizontal, curved trough-shaped contactor 16 (Fig. 3) are secured to the arm 11 by bolts 14—14. The bracket 15 has a plurality of aligned holes 17—17 (Figs. 3 and 4) formed therein, through which a plurality of cotter pins 19—19 extend. A cable 18 leading from the test set 13 is connected to one of the bolts 14—14 and serves to maintain the contactor 16, the bracket 15, and the cotter pins 19—19 at a high potential when the test set 13 is in operation.

Figure 3:
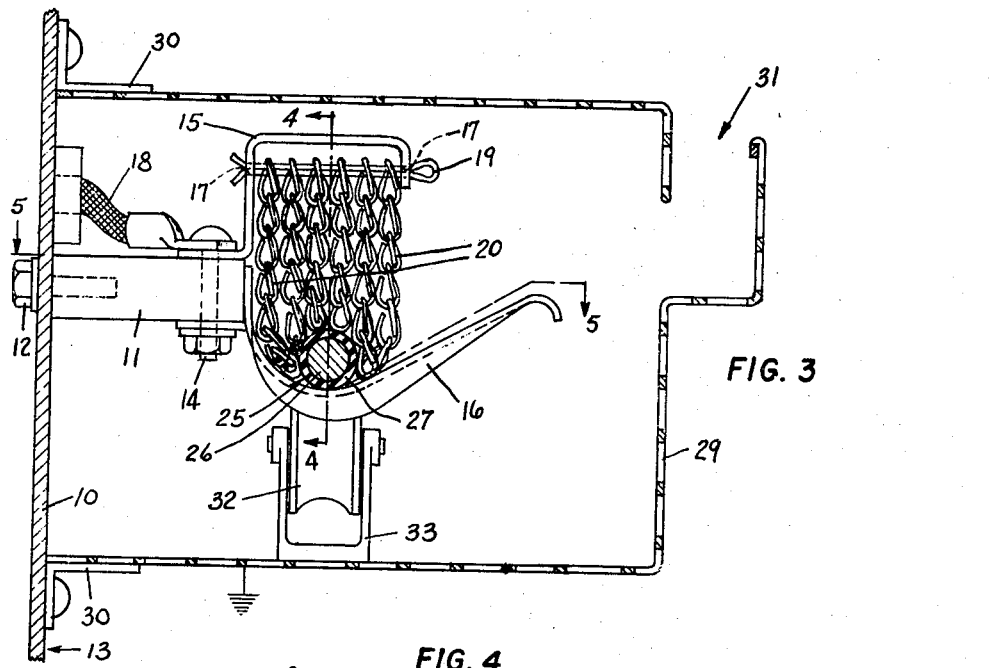
Fig. 3 is an enlarged, vertical section taken along line 3—3 of Fig. 1.

A plurality of substantially parallel series of short-linked, very flexible chains 20—20 (Figs. 3 and 4) are suspended from the cotter pins 19—19. The chains 20—20 are made of brass or other conductive material, and are of a double-jack type. Such chains are very flexible and do not kink readily. The construction of this type of chain is shown in Fig. 6. As is illustrated in Fig. 3, the innermost series of the chains 20—20 are relatively short, and the outer series of chains are progressively longer. The ends of the outermost ones of the chains 20—20 rest upon and are deflected inwardly by the trough-shaped contactor 16. Thus, the ends of the plurality of series of the chains 20—20 together with the contactor 16 form an elongated, substantially cylindrical passage therebetween.

An insulated conductor 25 (Fig. 3) comprising a central conductor 26 and an insulating jacket 27, may be advanced through the cylindrical passage formed by the chains 20—20 and the contactor 16 by a take-up reel 28 (Fig. 1) driven by any suitable source of power (not shown). The above mentioned passage is slightly smaller in diameter than is the conductor 25 so that as the conductor is advanced between the chains 20—20 and the contactor 16, the ends of the chains and the contactor engage the outer periphery of the insulating jacket 27. The ends of the chains 20—20 engage the jacket 27 at those points about the periphery thereof not engaged by the contactor 16. Thus, the chains and the contactor come into contact with the jacket 27 substantially entirely around the periphery thereof.

An elongated grounded guard 29 (Fig. 3) secured to the housing 10 by brackets 30—30 surrounds the trough-shaped contactor 16 and the bracket 15 and extends a substantial distance beyond the ends thereof. The guard 29 is open at both ends to permit the insulated conductor 25 to be advanced therethrough and is provided with a small L-shaped passage 31 at the right hand side thereof, as shown in Fig. 3. The passage 31 permits the conductor 25 to be inserted between the chains 20—20 and the contactor 16 when the conductor is grasped at points beyond the ends of the guard, but prevents an operator from contacting the contactor 16, the chains 20—20 or any other charged portion of the device at any time. The guard 29 is grounded and thereby prevents any accidents.

Two rollers 32—32 are mounted upon a pair of brackets 33—33 secured to the guard 29 at each end thereof. The upper portions of the rollers 32—32 are aligned with the lowermost part of the curved upper surface of the contactor 16, as shown in Fig. 3, and the conductor 25 rests thereon as it is advanced by the take-up reel 28. If the insulating jacket 27 has any moisture on the surface thereof, any current supplied to the jacket 27 by the contactor 16 and the chains 20—20 will be grounded. Consequently, an operator may safely handle the conductor 25 at either end of the guard 29, even though the contactor 16 and the chains 20—20 are at a high potential.

In the operation of the device, the conductor 25 is placed between the chains 20—20 and the contactor 16 in the manner described hereinabove. The central conductor 26 (Fig. 3) of the insulated conductor 25 is connected to the take-up reel 28, which is grounded. The test set 13 then is turned on, whereby a high potential is impressed upon the chains 20—20 and the contactor 16. The take-up reel 28 is rotated to draw the conductor 25 over the rollers 32—32 and between the chains 20—20 and the contactor 16, which contact substantially the entire periphery of the jacket 27 and subject each increment of the surface of the jacket to a high potential. If there is a defect in the jacket, the high potential of one of the chains 20—20 or of the contactor 16 will be transmitted through the defect to the grounded conductor 26. Such an occurrence will be indicated by the test set 13 to which the cable 18 is connected.

Since the chains 20—20 and the contactor 16 form therebetween an elongated, substantially cylindrical passage somewhat smaller in diameter than the diameter of the insulated conductor 25, the jacket 27 is engaged by the lower ends of the chains 20—20 and the contactor 16 and the chains are dragged along the path of the conductor to the extent permitted by the lengths of the chains. Thus, the ends of the chains sweep over the outer surface of the jacket 27 and tend to subject all parts of the jacket within their reach to the high potential impressed on the chains. As will be evident from Fig. 3 of the drawings, the free ends of the long outer chains tend to slide down the sides of the trough-shaped contactor 16 toward the center of the contactor and thus the ends of these chains are caused to extend partly under the insulated conductor into engagement with portions of the insulating jacket 27 that are not engaged by the contactor or by the ends of the other chains. The chains 20—20 are extremely flexible and the free ends thereof remain in contact with the jacket 27 even if the contour of the various parts of the jacket should vary. Consequently, any defect in the jacket 27 will be adjacent to the trough-shaped contactor or the free end of at least one of the chains 20—20 at some time during its passage through the composite electrode.

The short-linked, double-jack chains 20—20 are very flexible and are almost impossible to kink in the ordinary use thereof. Thus, the lower ends of the chains adapted themselves readily to the changing contour of the periphery of the insulated conductor 25. Since the contactor 16 presses against the lower ends of the longer chains, it maintains them in contact with the conductor 25. Also, the shape of the contactor 16 prevents the chains 20—20 from catching thereon.

The guard 29 and the rollers 32—32 prevent any accidents to an operator from the high potential of the chains 20—20 or the trough-shaped contactor 16 described above. The guard 29 enables an operator to insert an insulated conductor, such as the conductor 25, between the chains 20—20 and the contactor 16, but prevents the operator from touching the chains or the electrode at any time during the operation of the device.

An alternative form of guard, which is shown in Fig. 7, may be substituted for the guard 29, if it is so desired. This guard, which is designated generally by the numeral 129, comprises a grounded sheet-metal housing 130 bolted to the housing 10 of the test set 13. An L-shaped sheet-metal door 131 hinged to the housing 130 has an arm 138 secured thereto which is designed to engage a spring pressed plunger 134 on a microswitch 135 to close the microswitch when the door 131 is closed. An opening 136 in the door 131 permits the contactor 16 and the chains 20—20 to be observed, while a screen 137 secured thereover prevents contact with normally charged elements of the device when the door 131 is closed.

Openings, such as an opening 139, are formed in the sides of the door 131 and the housing 130 to permit a conductor similar to the conductor 25 to be drawn through the guard 129. Metal rollers, illustrated by a roller 132, are mounted on metal brackets, illustrated by the bracket 133, in a manner similar to that in which the rollers 32—32 are mounted.

The contacts (not shown) of the microswitch are in series with the power supply which energizes the test set 13. When the door 131 is closed, the arm 138 engages the plunger 134 to close the contacts of the microswitch, thereby permitting the composite electrode to be energized. When the door 131 is opened, the arm 138 is moved out of engagement with the plunger 134 and the microswitch is opened to cut off the power from the test set. Consequently, as long as the door 131 is open it is impossible for an operator to be injured by contact with any portion of the device which is charged during the normal operation of the device.

The passage formed between the chains 20—20 and the contactor 16 may be varied in size easily to adapt the device to test insulated conductors having different diameters from that of the insulated conductor 25. This may be done merely by substituting chains of different lengths for the chains 20—20.

It is sometimes desirable to test insulated conductors of oval, triangular or other non-circular cross sections and apparatus embodying this invention may be adapted readily for this purpose. For testing insulated conductors whose cross sections are not circular, a contactor similar to the contactor 16 but of a shape suitable to contact the lower periphery of the conductor of the particular type being tested, may be employed. Chains of suitable lengths may be substituted for the chains 20—20 to form with the above mentioned substituted contactor a passage for the conductors of other than circular cross sections so that the ends of the chains contact such a conductor about its entire periphery as it is advanced through the passage.

While the apparatus described hereinabove has been illustrated as employed in testing the insulating jacket on a single conductor wire, it is obvious that apparatus embodying the invention may be used with substantially equal ease to test the insulation on multi-conductor wires or cables.

What is claimed is:

1. In an apparatus for testing insulated conductors, means for supporting an insulated conductor, a plurality of flexible, electroconductive chains of different lengths, and means for supporting each of the chains from only one of the ends thereof and over the supporting means with the longer chains at the sides of the axis of an insulated conductor positioned on the conductor supporting means and the shorter chains approximately over that axis.

2. In an apparatus for testing continuous lengths of insulated conductors, a horizontally disposed, solid contactor having a concave upper surface along which an insulated conductor to be tested may be advanced, a plurality of flexible chains of different lengths, and means for supporting each of the chains from only one of the ends thereof over the concave surface whereby the free ends of the chains and the concave surface on the contactor form a passage of substantially the same shape as that of a conductor advanced between the contactor and the chains.

3. In an apparatus for testing the insulation on continuous lengths of insulated conductors including means for advancing such a conductor along a predetermined path, an electrode comprising a support positioned above the path of the conductor, and a plurality of series of very flexible chains, each of the chains being suspended from the support at only one of its ends with its opposite end depending freely in the path of the conductor, each of the series of chains being substantially parallel to the path of the conductor and extending along the support and the chains of the several series being of unequal lengths and so positioned that the free ends thereof form an elongated passage of substantially semicircular cross section, whereby the free ends of the chains engage and sweep over a substantial portion of the outer surface of the insulation on the insulated conductor as the conductor is advanced therepast.

4. In an apparatus for testing insulated conductors, a concave contactor for supporting an insulated conductor, a plurality of series of flexible, short-linked chains of different lengths, and means for suspending each of the chains from only the upper end thereof with the upper ends of the chains forming a horizontal plane, the longer chains being suspended in series of rows extending along the contactor at the outside of the shorter chains and the free ends of the longer chains resting on the concave contactor, whereby the free ends of the longer chains are tucked by the concave contactor under an insulated conductor supported by the contactor thereby increasing the area of the insulation on the conductor engaged by the chains.

5. In an apparatus for testing insulated conductors, an upwardly facing, trough-shaped contactor for supporting thereon an insulated conductor, a plurality of short-linked, flexible, electroconductive chains of different lengths, and means positioned over the contactor for supporting each of the chains from one end thereof with the other end thereof hanging free of the supporting means, the shorter chains being suspended in series of rows extending along and positioned over the central portion of an insulated conductor supported by the contactor and contacting the upper portion of the periphery of the conductor with the free ends thereof and the longer chains being suspended in series of rows extending along and positioned over the outer portions of the conductor with the free ends thereof resting upon the concave contactor, whereby the concave contactor tucks the free ends of the longer chains under the insulated conductor thereby increasing the area of the insulation on the conductor engaged by the chains.

WENTWORTH D. BOYNTON.
CLAY E. LEWIS.
GEORGE R. PAGE.

REFERENCES CITED

The following references are of record in the file of this patent:

UNITED STATES PATENTS

| Number | Name | Date |
|---|---|---|
| 1,407,693 | Heany | Feb. 28, 1922 |
| 1,525,286 | Gammeter | Feb. 3, 1925 |
| 1,779,907 | Dye | Oct. 28, 1930 |
| 1,952,582 | Cary et al. | Mar. 27, 1934 |
| 2,087,783 | Savage | July 20, 1937 |
| 2,221,323 | Gammeter | Nov. 12, 1940 |

FOREIGN PATENTS

| Number | Country | Date |
|---|---|---|
| 348,311 | Great Britain | May 14, 1931 |